(12) United States Patent
Mailoa et al.

(10) Patent No.: US 11,557,768 B2
(45) Date of Patent: Jan. 17, 2023

(54) PROTON EXCHANGE MEMBRANE FUEL CELL

(71) Applicant: Robert Bosch GmbH, Stuttgart (DE)

(72) Inventors: Jonathan P. Mailoa, Cambridge, MA (US); Yelena Gorlin, Menlo Park, CA (US); Karim Gadelrab, Boston, MA (US); Mordechai C. Kornbluth, Brighton, MA (US); Soo Kim, Cambridge, MA (US); Nathan P. Craig, Santa Clara, CA (US); John F. Christensen, Elk Grove, CA (US)

(73) Assignee: Robert Bosch GmbH, Stuttgart (DE)

( * ) Notice: Subject to any disclaimer, the term of this patent is extended or adjusted under 35 U.S.C. 154(b) by 157 days.

(21) Appl. No.: 16/836,119

(22) Filed: Mar. 31, 2020

(65) Prior Publication Data
US 2021/0305587 A1 Sep. 30, 2021

(51) Int. Cl.
| | | |
|---|---|---|
| *H01M 8/00* | (2016.01) | |
| *H01M 8/0221* | (2016.01) | |
| *H01M 8/04291* | (2016.01) | |
| *H01M 8/2457* | (2016.01) | |
| *H01M 4/88* | (2006.01) | |
| *H01M 8/22* | (2006.01) | |
| *H01M 8/10* | (2016.01) | |

(52) U.S. Cl.
CPC ......... *H01M 8/0221* (2013.01); *H01M 4/881* (2013.01); *H01M 4/8807* (2013.01); *H01M 8/04291* (2013.01); *H01M 8/22* (2013.01); *H01M 8/2457* (2016.02); *H01M 2008/1095* (2013.01)

(58) Field of Classification Search
CPC ............ H01M 8/0221; H01M 8/0204; H01M 8/0202; H01M 8/2457; H01M 8/04291; H01M 8/22; H01M 4/8807; H01M 4/881; H01M 4/8803; H01M 2008/1095
See application file for complete search history.

(56) References Cited

U.S. PATENT DOCUMENTS

| | | |
|---|---|---|
| 6,207,312 B1 | 3/2001 | Wynne et al. |
| 6,322,918 B1 | 11/2001 | Kelley et al. |
| 7,081,317 B2 | 7/2006 | Fujii et al. |
| 7,517,601 B2 | 4/2009 | Yoshikata et al. |
| 8,101,316 B2 | 1/2012 | Yoshikata et al. |
| 8,741,499 B2 | 6/2014 | Yoshikata et al. |
| 2003/0082425 A1 | 5/2003 | Leban |
| 2004/0115489 A1 | 6/2004 | Goel |

(Continued)

*Primary Examiner* — Raymond Alejandro
(74) *Attorney, Agent, or Firm* — Michael Best & Friedrich LLP

(57) ABSTRACT

A proton exchange membrane fuel cell includes an anode catalyst layer, a cathode catalyst layer, a proton exchange membrane separating the anode catalyst layer from the cathode catalyst layer, an oxygen inlet configured to supply oxygen to the cathode catalyst layer, and a hydrogen inlet separate from the oxygen inlet and configured to supply hydrogen to the anode catalyst layer. The fuel cell is operable to convert the hydrogen from the hydrogen inlet to hydrogen ions at the anode catalyst layer and to produce an H2O byproduct at the cathode catalyst layer where the oxygen reacts with the hydrogen ions. The fuel cell includes a water outlet for the H2O byproduct that is separate from the oxygen inlet.

19 Claims, 8 Drawing Sheets

(56) References Cited

U.S. PATENT DOCUMENTS

| | | | |
|---|---|---|---|
| 2005/0255373 A1* | 11/2005 | Kimura | H01M 8/04156 429/450 |
| 2007/0207361 A1* | 9/2007 | Yamashita | H01M 8/1025 429/493 |
| 2010/0068590 A1* | 3/2010 | Darling | H01M 8/04126 429/415 |
| 2011/0129757 A1 | 6/2011 | Diem et al. | |

* cited by examiner

PROTON EXCHANGE MEMBRANE FUEL CELL

BACKGROUND

The present invention relates to fuel cells. More particularly, the invention relates to proton exchange membrane fuel cells.

SUMMARY

The invention provides, in one aspect, a proton exchange membrane fuel cell comprising an anode catalyst layer, a cathode catalyst layer, a proton exchange membrane separating the anode catalyst layer from the cathode catalyst layer, an oxygen inlet configured to supply oxygen to the cathode catalyst layer, and a hydrogen inlet separate from the oxygen inlet and configured to supply hydrogen to the anode catalyst layer. The fuel cell is operable to convert the hydrogen from the hydrogen inlet to hydrogen ions at the anode catalyst layer and to produce an H2O byproduct at the cathode catalyst layer where the oxygen reacts with the hydrogen ions. The fuel cell includes a water outlet for the H2O byproduct that is separate from the oxygen inlet.

The invention provides, in another aspect, a proton exchange membrane fuel cell comprising an anode catalyst layer, a cathode catalyst layer, a proton exchange membrane separating the anode catalyst layer from the cathode catalyst layer, an oxygen inlet configured to supply oxygen to the cathode catalyst layer, and a hydrogen inlet separate from the oxygen inlet and configured to supply hydrogen to the anode catalyst layer. The anode catalyst layer, the cathode catalyst layer, the oxygen inlet, and the hydrogen inlet are positioned to one side of the proton exchange membrane.

The invention provides, in yet another aspect, a proton exchange membrane fuel cell comprising an anode catalyst layer, a cathode catalyst layer, an oxygen inlet configured to supply oxygen to the cathode catalyst layer, a hydrogen inlet separate from the oxygen inlet configured to supply hydrogen to the anode catalyst layer, a first hydrophobic layer positioned between the anode catalyst layer and the hydrogen inlet, a second hydrophobic layer positioned between the cathode catalyst layer and the oxygen inlet, and a hydrophilic water exhaust positioned to receive an $H_2O$ byproduct generated at the cathode catalyst layer through the proton exchange membrane.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
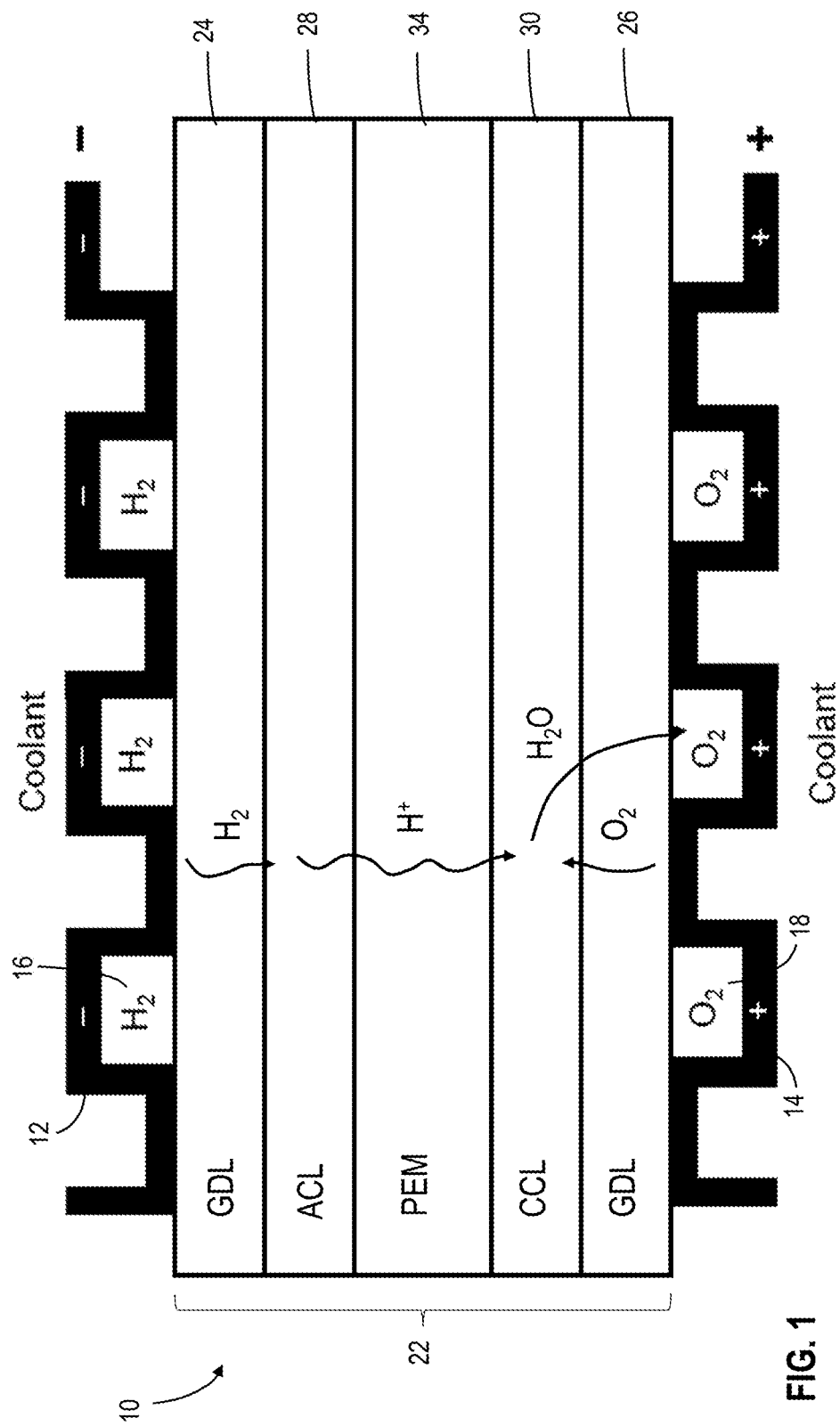
FIG. 1 is a schematic of a prior art proton exchange membrane (PEM) fuel cell with water exhaust through the air flow field.

FIG. 1 illustrates a prior art fuel cell 10, and more specifically a proton exchange membrane 34 (PEM) fuel cell 10. The fuel cell 10 includes electrodes 12, 14, a hydrogen supply channel 16 16, and an oxygen supply channel 18 separated from the hydrogen supply channel 16 by a fuel cell stack 22 comprising five layers.

The first and second layers of the fuel cell stack 22 are gas diffusion layers 24, 26 (GDL) and are located adjacent the hydrogen supply channel 16 and the oxygen supply channel 18, respectively. The gas diffusion layers 24, 26 are made of a carbon fiber based porous material and provide pathways for current collection. The third layer is an anode catalyst layer 28 (ACL). The anode catalyst layer 28 is located adjacent the first gas diffusion layer 24 such that the first gas diffusion layer 24 is located between the anode catalyst layer 28 and the hydrogen supply channel 16. A catalyst causes the fuel to undergo oxidation reactions, generating positively charged hydrogen ions (protons) and electrons at the anode catalyst layer 28. The oxidation reaction may be represented by $H_2 + 2H^+ + 2e^-$.

The fourth layer is a cathode catalyst layer 30 (CCL). The cathode catalyst layer 30 is located adjacent the second gas diffusion layer 26 such that the second gas diffusion layer 26 is located between the cathode catalyst layer 30 and the oxygen supply channel 18. The hydrogen ions react with the oxygen from the oxygen supply channel 18 at the cathode catalyst layer 30, generating water molecules. The reaction at the cathode catalyst layer 30 may be represented by $O_2 + 4H^+ + 4e^- \rightarrow 2H_2O$.

The fifth layer is a proton exchange membrane 34 (PEM) positioned between the anode catalyst layer 28 and the cathode catalyst layer 30. The proton exchange membrane 34 conducts hydrogen ions therethrough (from the anode catalyst layer 28 to the cathode catalyst layer 30) but prevents electrons from passing therethrough. Therefore, the overall arrangement of the fuel cell 10 of FIG. 1 is, in layered order, the hydrogen supply channel 16 and electrode 12, the first gas diffusion layer 24, the anode catalyst layer 28, the proton exchange membrane 34, the cathode catalyst layer 30, the second gas diffusion layer 26, and then the oxygen supply channel 18 and electrode 14. Additional layers serving different functions within the fuel cell 10 may be interspersed between the five layers described above. The layers shown in the drawings are not shown to scale.

The operation of the fuel cell 10 shown in FIG. 1 and described above results in a water molecule byproduct that necessitates an exit from the fuel cell stack 22. Often, the water is directed to the oxygen supply channel 18. When the fuel cell 10 operates at an increased power density, operation of the fuel cell 10 requires an increase in hydrogen and oxygen inputs through the respective supply channels 16, 18, producing a greater water output. The increased amount of water produced by this electrochemical process may lead to oxygen starvation, where the water molecules block the oxygen supply channel 18, limiting the amount of oxygen inflow into the cell 10. Similar mass transport limitations can also occur within the second gas diffusion layer 26 and within the cathode catalyst layer 30. Oxygen starvation can also contribute to reduced durability of the fuel cell 10.

Figure 2:
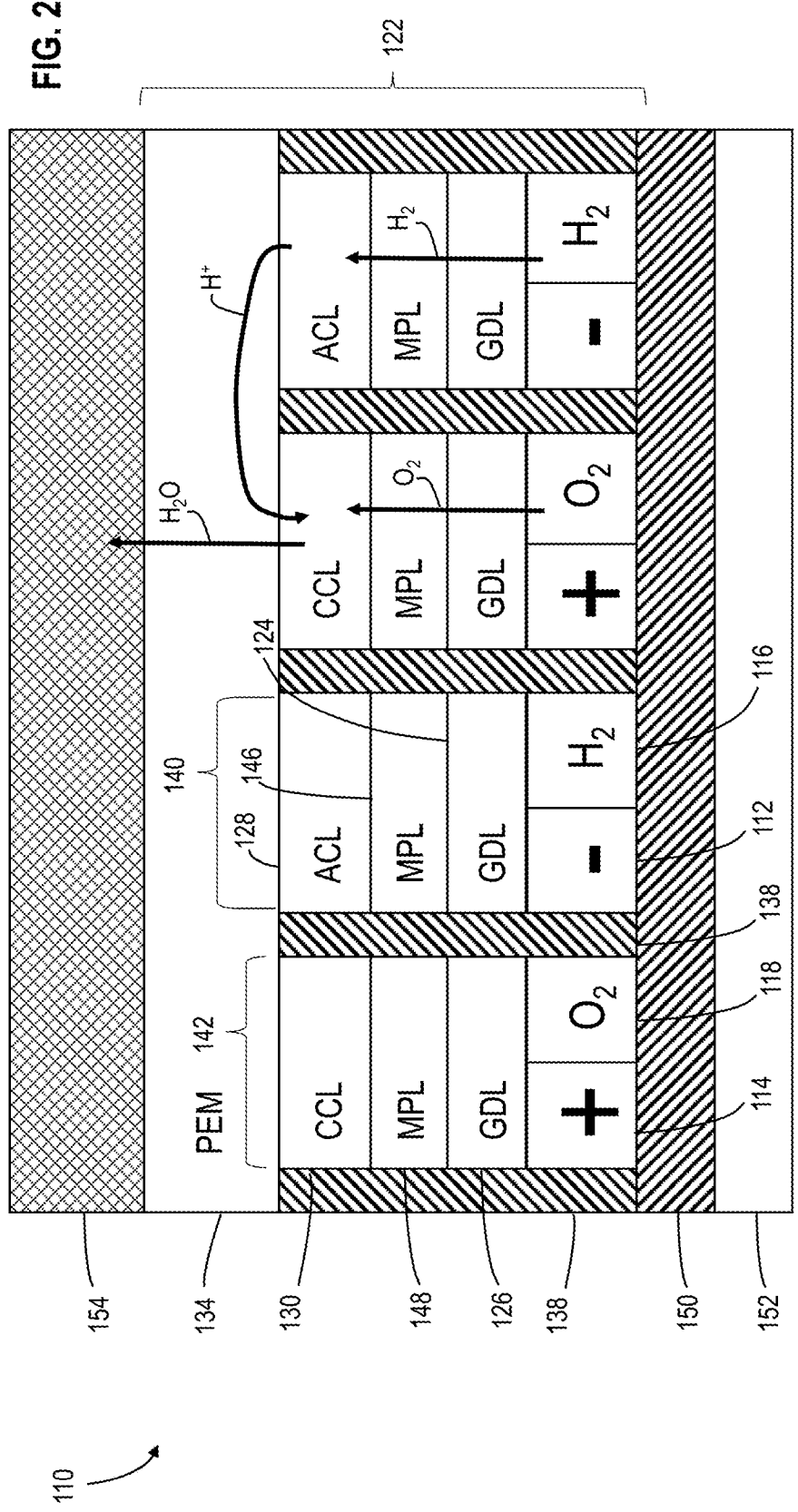
FIG. 2 is a schematic of an interdigitated back contact PEM fuel cell.

FIG. 2 illustrates a schematic of a fuel cell 110, and more specifically a proton exchange membrane fuel cell according to a first embodiment of the present disclosure that prevents or limits oxygen starvation within the fuel cell 110. The fuel cell 110 includes hydrogen and oxygen supply channels 116, 118 and five internal layers, similar to those of the fuel cell 10 shown in FIG. 1, though the arrangement of the layers is modified. The hydrogen supply channel 116 and the oxygen supply channel 118 are both located on the same one side (i.e., a first side) of the fuel cell 110, rather than on opposite sides as shown in FIG. 1. Further, both gas diffusion layers 124, 126, the anode catalyst layer 128, and the cathode catalyst layer 130 are all located between the proton exchange membrane 134 and the supply channels 116, 118.

The fuel cell 110 is constructed with an interdigitated arrangement where a plurality of separators 138 extend through the layers of the fuel cell 110, separating the first side of the fuel cell 110 into multiple sections 140, 142. As shown, the separators 138 extend between electrodes 112, 114 and supply channels 116, 118 and through the gas diffusion layers 124, 126, hydrophobic mesoporous layers 146, 148 (described in greater detail below), and the catalyst layers 128, 130. The separators 138 do not extend through the proton exchange membrane 134. The separators 138 function as partitions to separate the fuel cell layers of adjacent sections 140, 142 and to prevent flow of molecules (hydrogen, oxygen, water), protons (hydrogen ions) and electrons through the separator 138. Each of the separators 138 extends along a stacking direction of the fuel cell layers.

A first section 140 defined between adjacent separators 138 includes the hydrogen supply channel 116, the first gas diffusion layer 124, and the anode catalyst layer 128. A second section 142 defined between adjacent separators 138 includes the oxygen supply channel 118, the second gas diffusion layer 126, and the cathode catalyst layer 130. The first and second sections 140, 142 are located adjacent to one another, separated from each other in a lateral direction (perpendicular to the stacking direction of the layers) by a separator 138. The separator 138 terminates at the proton exchange membrane 134 such that the first and second sections 140, 142 are connected to one another via the proton exchange membrane 134. The proton exchange membrane 134 provides a lateral path for the flow of molecules, protons, and electrons between the first and second sections 140, 142. A pattern of alternating first and second sections 140, 142 may repeat over the widthwise direction of the fuel cell 110. As the separators 138 terminate at the proton exchange membrane 134, the proton exchange membrane 134 is not broken into widthwise sections corresponding to the repeating first and second sections 140, 142 but is rather a single layer spanning across multiple sections 140, 142 and multiple separators 138.

The fuel cell 110 of FIG. 2 further includes additional layers not included in the fuel cell 10 shown in FIG. 1. A first hydrophobic mesoporous layer 146 (MPL) is located between the first gas diffusion layer 124 and the anode catalyst layer 128 within the first sections 140. A second hydrophobic mesoporous layer 148 is located between the second gas diffusion layer 126 and the cathode catalyst layer 130 in the second section 142. The hydrophobic mesoporous layers 146, 148 prevent water from passing therethrough. As water is primarily generated (as a byproduct) within the fuel cell 110 at the cathode catalyst layer 130, the hydrophobic layers 146, 148 prevent water from reaching the oxygen supply channel 118 and the hydrogen supply channel 116.

The fuel cell 110 further includes a gas capping layer 150 that abuts the electrodes 112, 114 and the separators 138 to complete the stack 122. The gas capping layer 150 is an electrical insulator and a thermal conductor, enabling a flow of coolant 152 (external to the fuel cell stack 122) to regulate the temperature of the fuel cell 110.

The water generated by the chemical process within the fuel cell 110 is exhausted from the fuel cell 110 but lacks the exhaust options of the fuel cell 10 of FIG. 1, as the hydrophobic layers 146, 148 prevent the water from reaching the supply channels 116, 118. A hydrophilic water exhaust 154 (water exhaust capillary channel) is provided in the fuel cell 110 on the proton exchange membrane 134, on a side of the proton exchange membrane 134 opposite that of the layered sections 140, 142, to provide an exit or exhaust for the water byproduct. The hydrophilic water exhaust 154 also provides mechanical support. Water seeps out of the proton exchange membrane 134 through the microporous structure of the capillary water exhaust channel 154. Water can be removed from the ends of the exhaust channel 154 by drying, heating, vaporizing, pumping, adsorbing, or absorbing the water.

The layers of the fuel cell 110 are not presented to scale but are shown with exaggerated thickness for clarity. The proton exchange membrane 134 has a thickness of approximately 20 microns (e.g., 20 microns, 15-25 microns, 10-30 microns) and the gas diffusion layers 124, 126 have a thickness of approximately 200-500 microns. The anode and cathode catalyst layers 128, 130 are nanoparticle and/or polymer solutions applied on the gas diffusion layers 124, 126 or proton exchange membrane 134 with a continuous pore network established upon drying.

In operation, hydrogen ($H_2$) is provided into the first sections 140 from the hydrogen supply channel 116, through the first gas diffusion layer 124 and first hydrophobic layer 146, and to the anode catalyst layer 128. The hydrogen undergoes a chemical reaction, converting the hydrogen ($H_2$) to hydrogen ions (W) and electrons (e). The hydrogen ions pass through the proton exchange membrane 134, laterally around the separator 138, and to the cathode catalyst layer 130. Simultaneously, oxygen (02) is provided into the second sections 142 from the oxygen supply channel 118, through the second gas diffusion layer 126 and second hydrophobic layer 148, and to the cathode catalyst layer 130. The oxygen (02) at the cathode catalyst layer 130 reacts with the hydrogen ions (W) to generate water molecules ($H_2O$). The water is directed away from the supply channels 116, 118 by the hydrophobic layers 146, 148 and instead passes through the proton exchange membrane 134 to the hydrophilic water exhaust 154. For simplicity, arrows illustrating the flow of molecules and ions are only shown with respect to a single pair of sections 140, 142, though similar reactions take place at all locations along the lateral width of the fuel cell 110.

As the water is unable to pass through the first and second hydrophobic layers 146, 148 and is otherwise provided with an alternative exhaust, the inlet channels 116, 118 (and specifically the oxygen inlets 116) and gas diffusion layers 124, 126 are not blocked by water molecules, thereby eliminating or limiting oxygen starvation within the fuel cell 110. In addition, because the electrodes 112, 114 are on the same side of the membrane 134, fuel cell degradations, which can occur due to membrane puncture (gas crossover, shorting) are less likely to occur because proton and mass transport occur laterally, rather than along the fuel cell layering or stacking direction.

Figure 3:
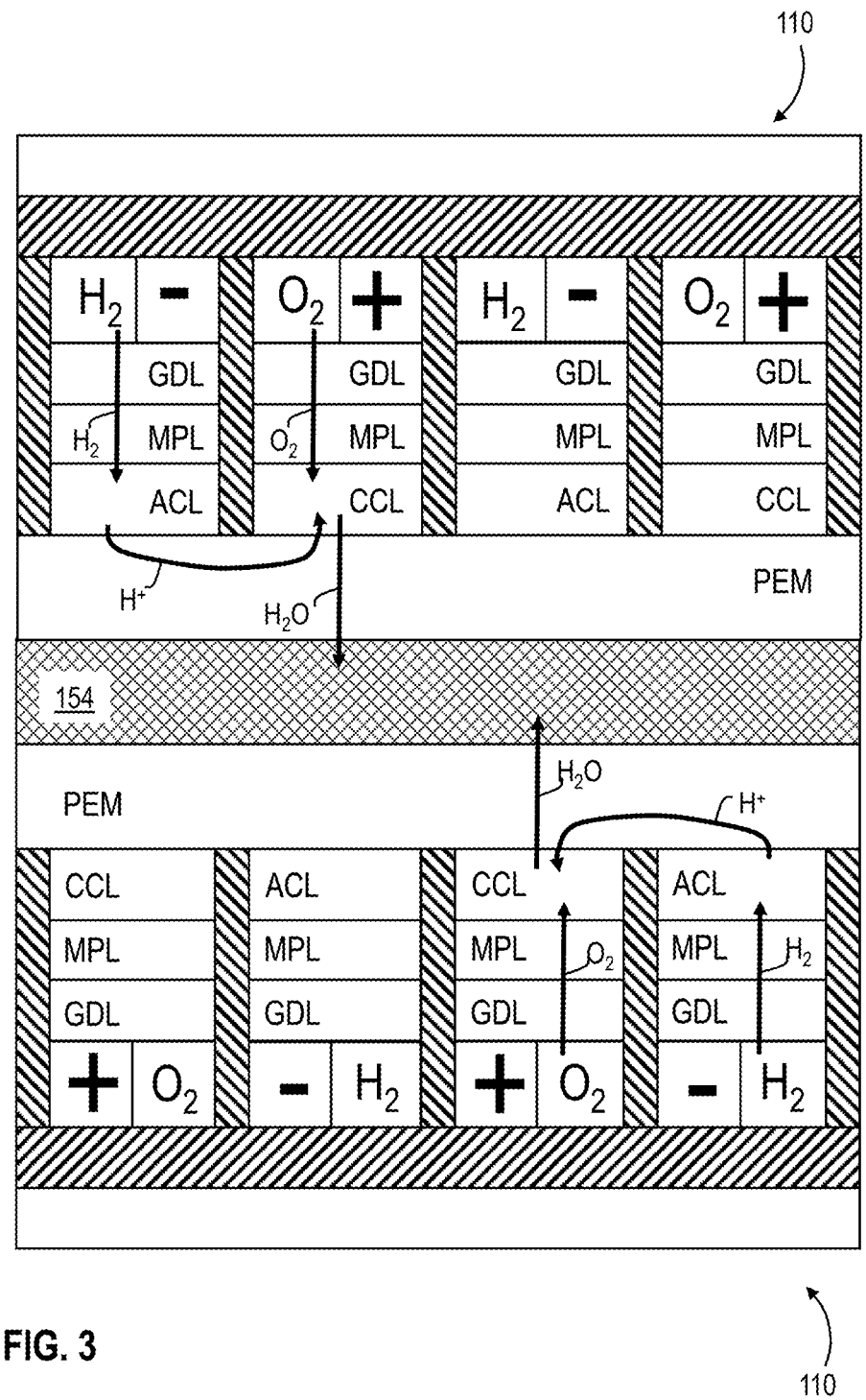
FIG. 3 is a schematic back-to-back arrangement of multiple fuel cells of FIG. 2.

FIG. 3 illustrates an arrangement similar to FIG. 2 with two fuel cells 110, having independent fuel cell stacks, in a back-to-back arrangement, with a single shared hydrophilic water exhaust 154. In some embodiments, each fuel cell 110 has its own water exhaust 154 such that two water exhausts 154 are brought or joined together, functioning as a single central water exhaust 154 for the assembly of paired fuel cells 110.

Figure 4:
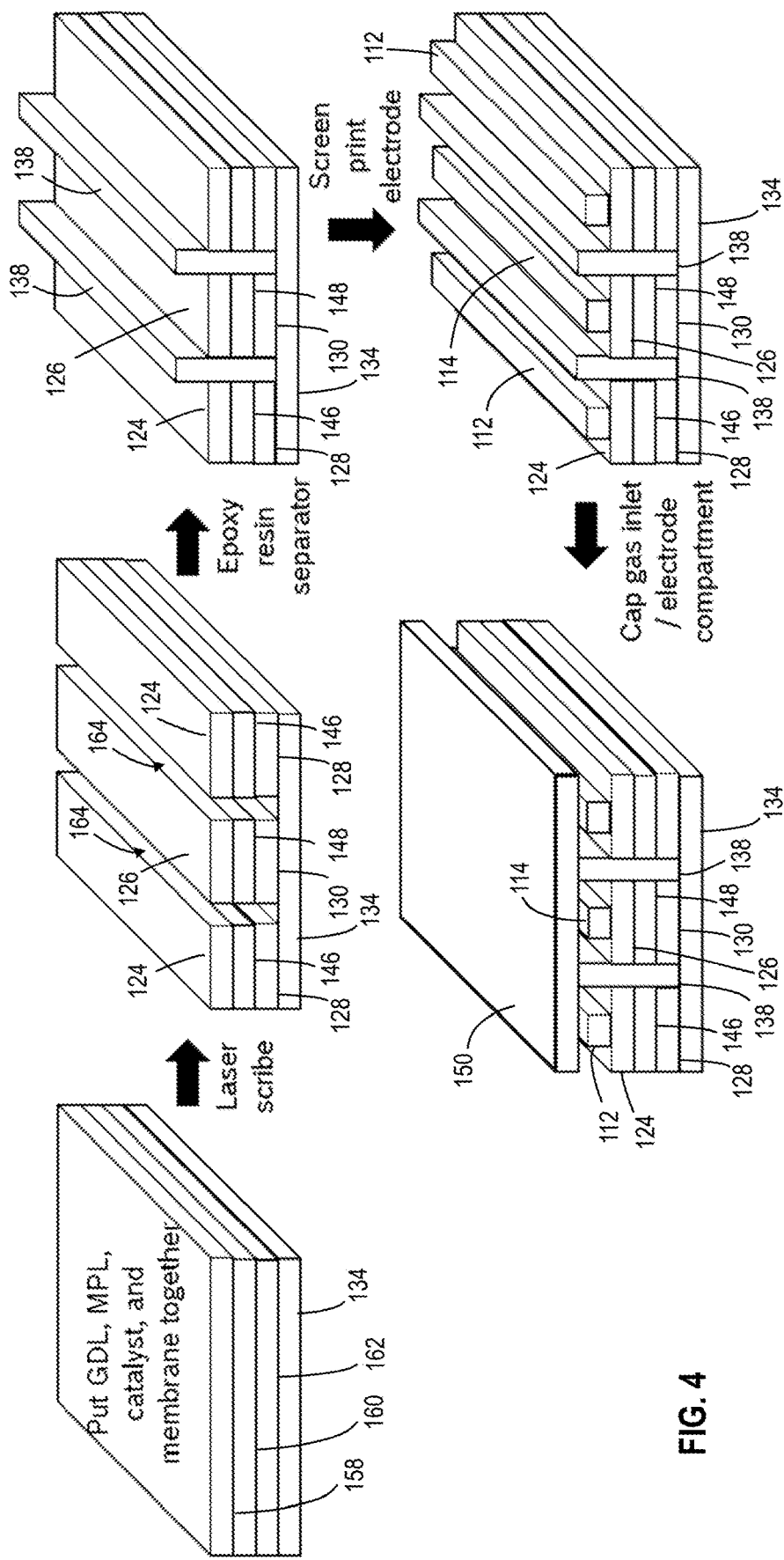
FIG. 4 is a schematic of a first fabrication workflow of the fuel cell of FIG. 2.
Figure 5:
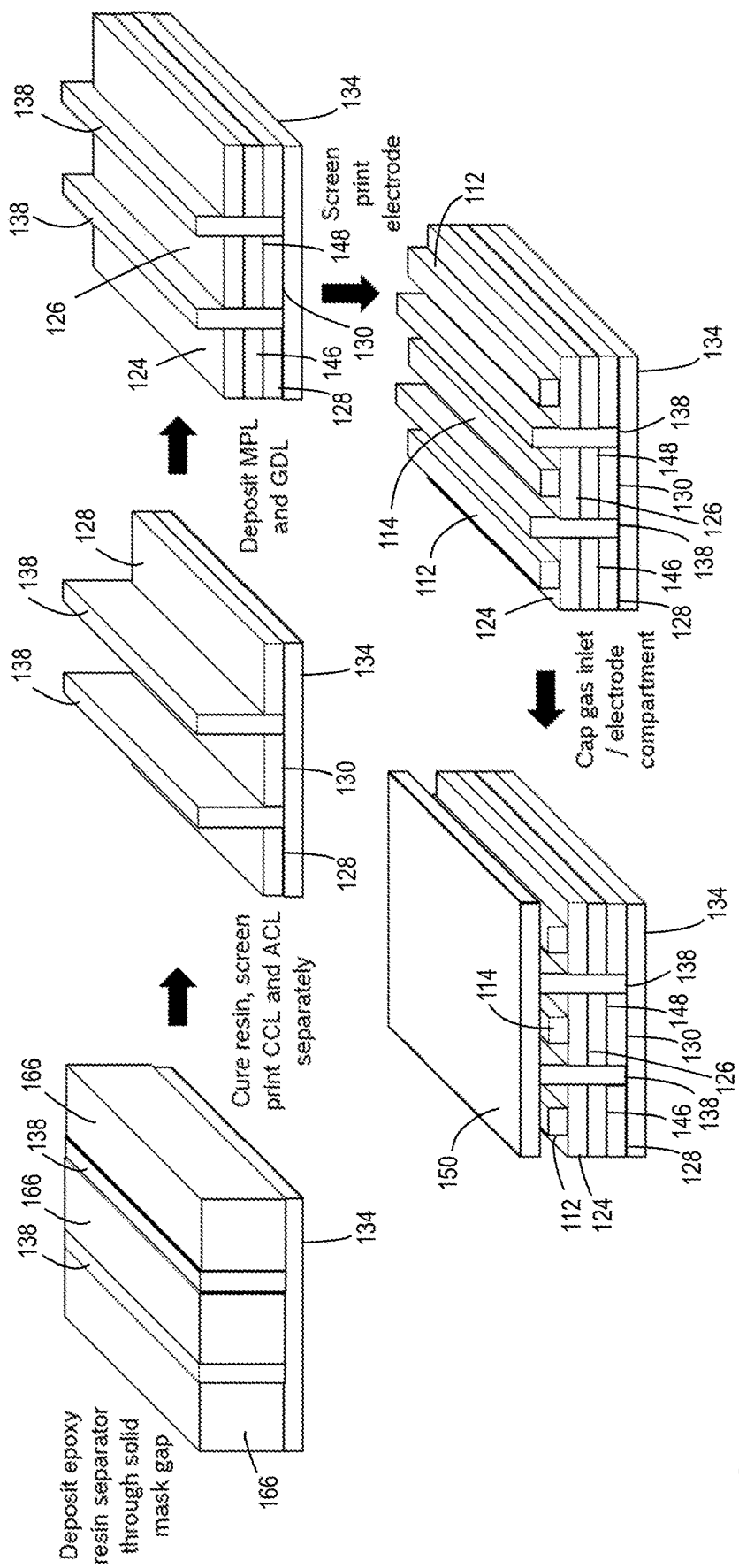
FIG. 5 is a schematic of a second fabrication workflow of the fuel cell of FIG. 2.

FIGS. 4 and 5 illustrate fabrication workflows for producing the fuel cell structure illustrated in FIG. 2. The process shown in FIG. 4 begins with assembling an initial gas diffusion layer 158, an initial hydrophobic layer 160, an initial catalyst layer 162, and the proton exchange membrane 134 into a stacked configuration. Notably, the arrangement shown in FIG. 4 is inverted relative to the stacked arrangement shown in FIG. 2. As shown, both the initial gas diffusion layer 158 and the initial hydrophobic layer 160 are formed as single layers. The stack 122 is laser scribed to separate the single gas diffusion layer 158 into distinct rows including the first and second gas diffusion layers 124,126. Laser scribing further separates the hydrophobic layer 160 into the first and second hydrophobic layers 146, 148 and separates the initial catalyst layer 162 into the anode catalyst layer 128 and the cathode catalyst layer 130 along the same distinct rows as the gas diffusion layers 124, 126. The laser scribing does not separate the proton exchange membrane 134. The gaps 164 created by the laser scribing are filled by depositing epoxy resin therein. The epoxy resin material solidifies, forming the separators 138 used to spatially separate the interdigitated layers. Finger electrodes 112, 114 are then screen-printed between the separators 138 and the gas capping layer 150 is added above the electrodes 112, 114 to complete the stack 122.

As shown in FIG. 3, two of the stacks 122 can be put back-to-back, separated by the hydrophilic water exhaust 154. Formation of the second stack 122 can be substantially the same as the first stack 122, though reusing the same water exhaust 154.

FIG. 5 illustrates a fabrication workflow that differs from the workflow shown in FIG. 4. The workflow shown in FIG. 4 makes use of an initial catalyst layer 162 that is split into anode and cathode catalyst layers 128, 130 such that the anode and cathode catalyst layers 128, 130 are made of the same material. The workflow shown in FIG. 5 provides an assembly that can utilize a first material for the anode catalyst layer 128 and a second, different material for the cathode catalyst layer 130.

In FIG. 5, epoxy resin is deposited on the proton exchange membrane 134 through a gap-patterned solid mask 166 made of metal and/or plastic. The deposited epoxy forms the separators 138. The epoxy separators 138 can be UV-cured prior to removing the mask 166 as the epoxy separators 138 are likely have a high aspect ratio (e.g., greater than 2:1, height to width). FIG. 5 illustrates rectangular separators 138, however the separators can have angled side surfaces resulting in a trapezoidal shape (i.e., formed with trapezoidal mask geometry) to provide additional stability given the high aspect ratio of the separator 138. Alternatively, the proton exchange membrane 134 itself may be fabricated to have these separator grooves. Once the mask 166 is removed, the cathode catalyst layer 130 and the anode catalyst layer 128 are separately screen-printed into the different sections 140, 142 between the separators 138. Separately screen-printing the anode and cathode catalyst layers 128, 130 enables independent tuning of the catalyst loading in the layers 128, 130. For example, it may be beneficial to provide the cathode catalyst layer 130 with higher Pt catalyst loading than the anode catalyst layer 128. With the anode and cathode catalyst layers 128, 130 in place, the hydrophobic layers 146, 148 and gas diffusion layers 124, 126 are deposited on the anode and cathode catalyst layers 128, 130 in the separator gaps 164. The final steps are similar to that of FIG. 4. The positive and negative finger electrodes 112, 114 are screen-printed in the middle of the gaps 164, followed by placement of a gas capping layer 150.

Figure 6:
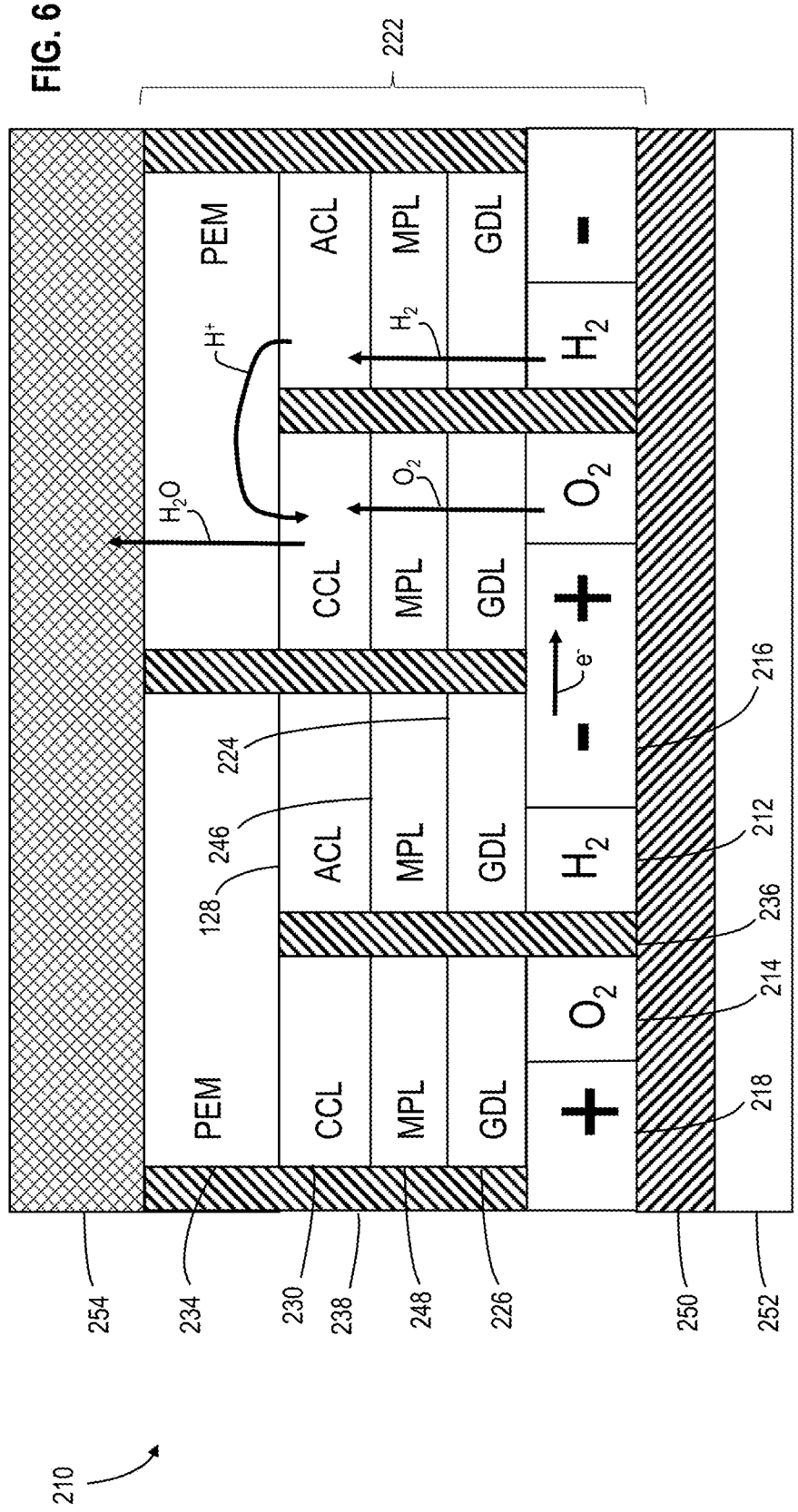
FIG. 6 is a schematic of an interdigitated back contact PEM fuel cell according to another embodiment.

FIG. 6 illustrates a fuel cell 210 according to another embodiment. The fuel cell 210 is similar to the fuel cell 110 shown in FIG. 2 with similar elements having similar reference numerals incremented by 100. In contrast to the fuel cell 110 that utilized a parallel configuration of electrodes 112, 114, the fuel cell 210 utilizes a series configuration of electrodes 212, 214, where positive and negative electrodes 212, 214 of each segment are shared, and only the hydrogen and oxygen supply channels 216, 218 are separated.

In the arrangement shown in FIG. 6, the proton exchange membrane is divided into multiple separate membranes 234, each proton exchange membrane 234 associated with an adjacent pair of sections 240, 242. Dividing the proton exchange membrane 234 can prevent (or limit) ionic conduction shorting. Further, the separators 236, 238 are offset from one another (in the layered direction) in a repeating pattern. A first separator 236 extends between the hydrogen and oxygen supply channels 216, 218 and terminates at the proton exchange membrane 234, similar to the separators 138 shown in FIG. 2. A second separator 238 is spaced away from the gas capping layer 250, thereby permitting a connection between the adjacent electrodes 212, 214. The second separator 238 extends through the proton exchange membrane 234, terminating at the hydrophilic water exhaust 254. The first and second separators 236, 238 alternate along the lateral direction. The proton exchange membranes 234 and sections 240, 242 are therefore separated yet connected to another in a serpentine manner, which allows for continuous lateral conduction for the hydrogen ions (protons) and the electrons. The series arrangement shown in FIG. 6 enables larger cells 210 while limiting electrical losses, as the arrangement does not collect current through long and thin electrode fingers.

Figure 7:
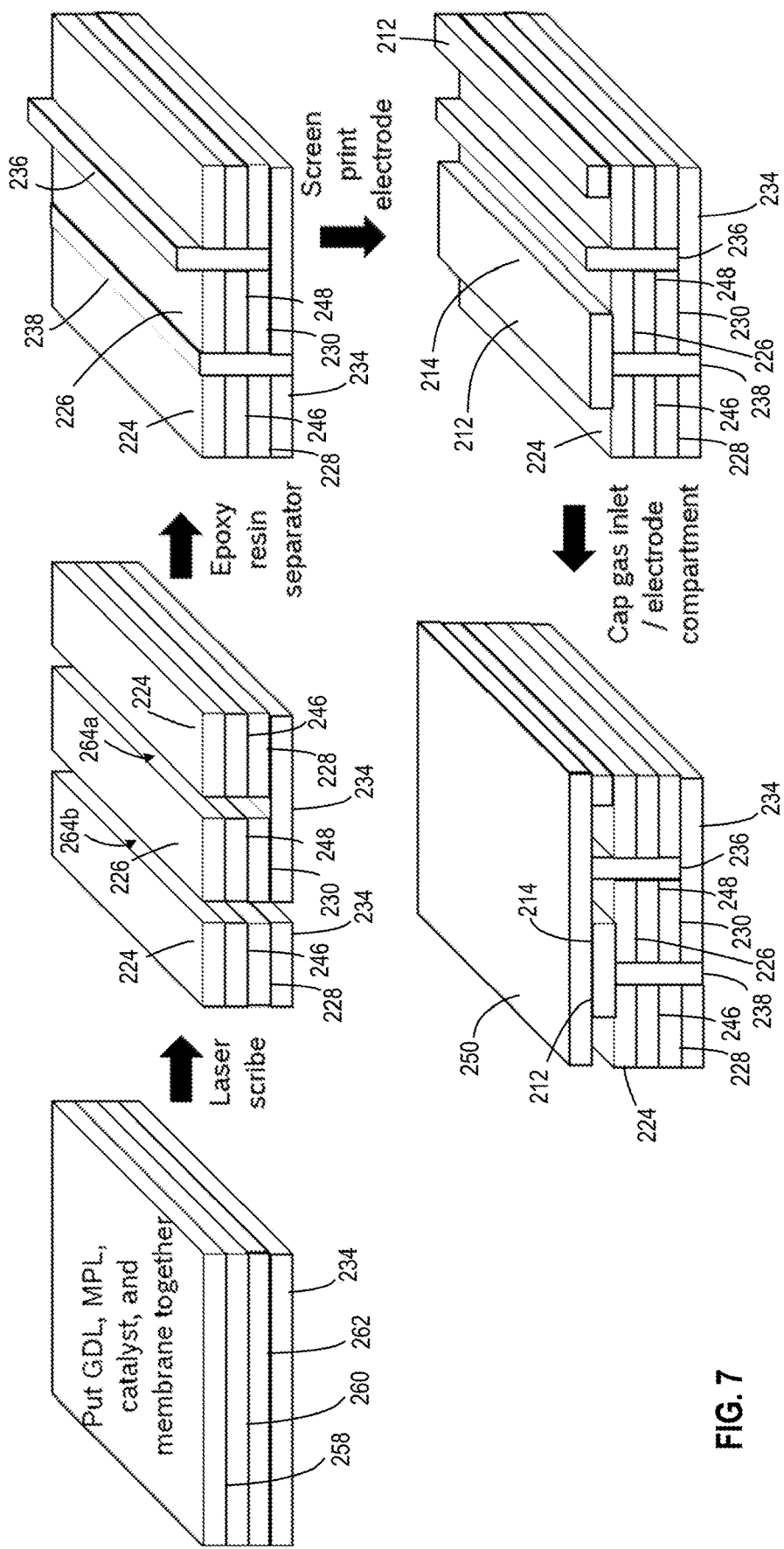
FIG. 7 is a schematic of a first fabrication workflow of the fuel cell if FIG. 6.
Figure 8:
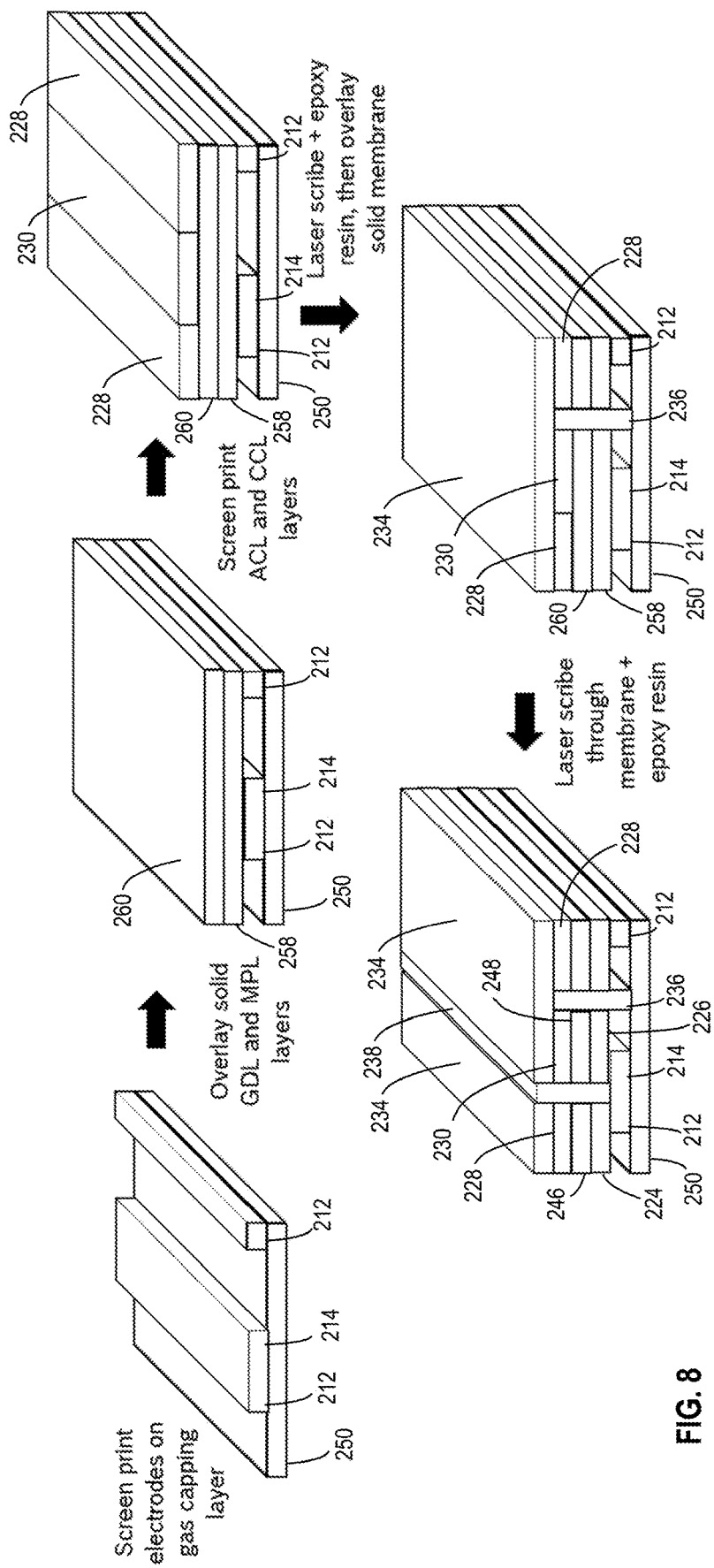
FIG. 8 is a schematic of a second fabrication workflow of the fuel cell if FIG. 6.

FIGS. 7 and 8 illustrate fabrication workflows for producing the fuel cell structure illustrated in FIG. 6. The process shown in FIG. 7 is similar to the process shown in FIG. 4, though varies based on the differences between the fuel cells 110, 210. First, an initial gas diffusion layer 258, an initial hydrophobic layer 260, an initial catalyst layer 262, and the proton exchange membrane 234 are arranged into a stacked configuration. The stack 222 is cut via laser scribing to create distinct rows and gaps 264 therebetween for the separators 236, 238. Differing from FIG. 4, in FIG. 7 the laser scribing cuts to varying depths in a repeating pattern such that a first gap 264a extends only through the initial gas diffusion layer 258, the initial hydrophobic layer 260, and the initial catalyst layer 262 and a second gap 264b extends through the proton exchange membrane 234 in addition to these three layers 258, 260, 262. The fuel cell 210 includes a repeating pattern of first and second gaps 264a, 264b such that the proton exchange membrane 234 bridges every first gap 264a. Epoxy resin is deposited in the gaps 264 to define the separators 236, 238. As shown, the separator 236 within the second gap 264b extends above the gas diffusion layer 258, which aids in separating the hydrogen and oxygen supply channels 216, 218. Production of the separators 236, 238 may utilize masks (not shown) similar to those described with respect to FIG. 5. With the separators 236, 238 in place, the electrodes are then screen-printed between the separators 236, 238, and a gas capping layer 250 is added above the electrodes 212, 214 to complete the stack 222. The gas capping layer 250 is airtight against the separators 236, 238 to prevent fuel mixing in the lateral direction.

FIG. 8 illustrates a fabrication workflow that is approximately a reversal of the fabrication process shown in FIG. 7. In this fabrication workflow, the base or starting point of the assembly is the gas capping layer 250, onto which the electrodes 212, 214 are screen printed. The initial gas diffusion layer 258 and the initial hydrophobic layer 260 are overlaid onto the electrodes 212, 214. The anode catalyst layers 228 and the cathode catalyst layers 230 are screen printed onto the stack 222, specifically over the hydrophobic layer 260. The stack 222 is cut via laser scribing, terminating at the gas capping layer 250, thereby providing gaps 264a for the separators 236 that do not extend through the proton exchange membrane 234. These gaps 264a are filled with the epoxy separators 236. The proton exchange membrane 234 is then applied to the stack 222. Additional gaps 264b are formed through the proton exchange membrane 234, the catalyst layer 228, 230, the hydrophobic layer 260, and the gas diffusion layer 258 via laser scribing, these gaps 264b aligned with and terminating at the electrode 212, 214. The gaps 264b are then filled with the epoxy separators 238 via one of the methods described with respect to FIG. 4, 5, or 7.

Both parallel and series configurations are available for the fuel cells 110, 210 as shown in the figures and described above. Further, additional fuel cell designs may employ a combination of the two configurations by patterning the separators 138, 236, 238 and layer depositions accordingly. Further, these configurations may be made as a continuous process (similar to roll-to-roll processing) rather than a batch fabrication process.

Various features and advantages of the invention are set forth in the following claims.

What is claimed is:

1. A proton exchange membrane fuel cell comprising:
    an anode catalyst layer;
    a cathode catalyst layer;
    a proton exchange membrane separating the anode catalyst layer from the cathode catalyst layer;
    an oxygen inlet configured to supply oxygen to the cathode catalyst layer;
    a hydrogen inlet separate from the oxygen inlet and configured to supply hydrogen to the anode catalyst layer; and
    a separator positioned between the anode catalyst layer and the cathode catalyst layer perpendicular to a stacking direction of the proton exchange membrane fuel cell, wherein the separator prevents transmission of the hydrogen, the hydrogen ions, the oxygen, and the $H_2O$ byproduct therethrough;
    wherein the fuel cell is operable to convert the hydrogen from the hydrogen inlet to hydrogen ions at the anode catalyst layer and to produce an $H_2O$ byproduct at the cathode catalyst layer where the oxygen reacts with the hydrogen ions, and
    wherein the fuel cell includes a water outlet for the $H_2O$ byproduct that is separate from the oxygen inlet.

2. The proton exchange membrane fuel cell of claim 1, wherein the water outlet is separate from the hydrogen inlet.

3. The proton exchange membrane fuel cell of claim 1, wherein the water outlet is a hydrophilic water exhaust.

4. The proton exchange membrane fuel cell of claim 1, further comprising a hydrophobic layer positioned between the oxygen inlet and the cathode catalyst layer such that oxygen from the oxygen inlet is configured to pass through the hydrophobic layer prior to reaching the cathode catalyst layer.

5. The proton exchange membrane fuel cell of claim 1, wherein the proton exchange membrane extends across an end of the separator to connect the anode catalyst layer to the cathode catalyst layer.

6. The proton exchange membrane fuel cell of claim 5, wherein the separator is an epoxy resin protrusion extending from a gas capping layer and terminating at the proton exchange membrane.

7. The proton exchange membrane fuel cell of claim 1, further comprising a first gas diffusion layer between the hydrogen inlet and the anode catalyst layer and a second gas diffusion layer between the oxygen inlet and the cathode catalyst layer.

8. The proton exchange membrane fuel cell of claim 1, further comprising a first electrode positioned adjacent the hydrogen inlet and a second electrode positioned adjacent the oxygen inlet.

9. A proton exchange membrane fuel cell comprising:
    an anode catalyst layer;
    a cathode catalyst layer;
    a proton exchange membrane separating the anode catalyst layer from the cathode catalyst layer;
    an oxygen inlet configured to supply oxygen to the cathode catalyst layer; and
    a hydrogen inlet separate from the oxygen inlet and configured to supply hydrogen to the anode catalyst layer;
    wherein each of the anode catalyst layer, the cathode catalyst layer, the oxygen inlet, and the hydrogen inlet are positioned to the same side of the proton exchange membrane.

10. The proton exchange membrane fuel cell of claim 9, further comprising a hydrophilic water exhaust positioned to an other side of the proton exchange membrane, opposite the one side.

11. The proton exchange membrane fuel cell of claim 9, further comprising a separator positioned laterally between the anode catalyst layer and the cathode catalyst layer, wherein the separator prevents transmission of the hydrogen and the oxygen therethrough.

12. The proton exchange membrane fuel cell of claim 9, further comprising a first electrode positioned adjacent the hydrogen inlet, a second electrode positioned adjacent the oxygen inlet, a first gas diffusion layer between the hydrogen inlet and the anode catalyst layer, and a second gas diffusion layer between the oxygen inlet and the cathode catalyst layer.

13. The proton exchange membrane fuel cell of claim 9, wherein the anode catalyst layer is laterally offset from the cathode catalyst layer.

14. The proton exchange membrane fuel cell of claim 9, further comprising a hydrophobic layer positioned between oxygen inlet and the cathode catalyst layer, wherein the hydrophobic layer is positioned to the one side of the proton exchange membrane.

15. A dual fuel cell assembly comprising the proton exchange membrane of claim 10, wherein the proton exchange membrane is a first proton exchange membrane, the dual fuel cell assembly further comprising a second proton exchange membrane positioned such that the hydrophilic water exhaust is positioned between the first proton exchange membrane and the second proton exchange membrane.

16. A proton exchange membrane fuel cell comprising:
an anode catalyst layer;
a cathode catalyst layer;
an oxygen inlet configured to supply oxygen to the cathode catalyst layer;
a hydrogen inlet separate from the oxygen inlet configured to supply hydrogen to the anode catalyst layer;
a first hydrophobic layer positioned between the anode catalyst layer and the hydrogen inlet;
a second hydrophobic layer positioned between the cathode catalyst layer and the oxygen inlet; and
a hydrophilic water exhaust stacked directly adjacent to the proton exchange membrane to receive an $H_2O$ byproduct generated at the cathode catalyst layer through the proton exchange membrane.

17. The proton exchange membrane fuel cell of claim 16, wherein the proton exchange membrane is operable as a fluid path between the anode catalyst layer and the cathode catalyst layer.

18. The proton exchange membrane fuel cell of claim 17, wherein the hydrophilic water exhaust is formed of a microporous structure configured to draw water away from the proton exchange membrane.

19. The proton exchange membrane fuel cell of claim 16, wherein the anode catalyst layer is laterally separated from the cathode catalyst layer via an epoxy separator.

* * * * *